United States Patent
Itoh et al.

(10) Patent No.: US 6,459,224 B2
(45) Date of Patent: Oct. 1, 2002

(54) ZONE CONTROL METHOD IN ROLLER CONVEYOR AND ZONE CONTROLLER

(75) Inventors: Kazuo Itoh, Kasai; Toshiyuki Tachibana, Himeji; Yoshiyuki Kujihashi, Ono, all of (JP)

(73) Assignee: Itoh Electric Company Limited, Hyogo (JP)

( * ) Notice: Subject to any disclaimer, the term of this patent is extended or adjusted under 35 U.S.C. 154(b) by 0 days.

(21) Appl. No.: 09/821,895

(22) Filed: Mar. 30, 2001

(30) Foreign Application Priority Data

Apr. 6, 2000 (JP) ........................................ 2000-104810

(51) Int. Cl.[7] ................................................ H02P 3/00
(52) U.S. Cl. ...................... 318/445; 318/138; 318/254; 318/362; 318/369; 318/371; 318/373; 318/375; 318/376; 318/383; 318/280; 318/283; 198/571; 198/577; 198/781
(58) Field of Search ................................ 318/138, 254, 318/445, 362, 369, 371, 373, 375, 376, 383, 280, 283; 198/781, 571, 577

(56) References Cited

U.S. PATENT DOCUMENTS

| | | | | |
|---|---|---|---|---|
| 3,940,670 A | * | 2/1976 | Tanikoshi | 318/254 |
| 4,223,775 A | * | 9/1980 | Lloyd | 192/0.094 |
| 4,396,876 A | * | 8/1983 | Tojiki et al. | 318/255 |
| 4,423,363 A | * | 12/1983 | Clark et al. | 318/375 |
| 5,035,414 A | * | 7/1991 | Shibanaka et al. | 271/227 |
| 5,186,308 A | * | 2/1993 | Munro | 198/572 |
| 5,228,558 A | * | 7/1993 | Hall | 198/784 |
| 5,254,915 A | * | 10/1993 | Komatsu et al. | 318/369 |
| 5,318,167 A | * | 6/1994 | Bronson et al. | 198/577 |
| 5,568,031 A | * | 10/1996 | Jinbo et al. | 318/630 |
| 6,021,888 A | * | 2/2000 | Itoh et al. | 198/783 |
| 6,244,421 B1 | * | 6/2001 | Hall | 198/460.1 |
| 6,286,654 B1 | * | 9/2001 | Gorniak et al. | 198/347.4 |

FOREIGN PATENT DOCUMENTS

| | | | | |
|---|---|---|---|---|
| JP | 61-177188 | * | 8/1986 | H02P/5/402 |
| JP | 02-239091 | * | 9/1990 | B66B/25/00 |
| JP | 2000-086139 | * | 3/2000 | B66B/29/04 |

\* cited by examiner

Primary Examiner—Shih-Yung Hsieh
Assistant Examiner—Tyrone Smith
(74) Attorney, Agent, or Firm—Wood, Phillips, Katz, Clark & Mortimer

(57) ABSTRACT

In a roller conveyor system for carrying out zone control, a conveyed article can be stopped in an approximately constant position without varying the position where the article is stopped in a desired control zone even if the weight of the article varies. In order to syop the article in a predetermined control zone, such stop control is carried out that a motor is decelerated and stopped in a plurality of braking systems depending on the change in the pulse width of a rotational pulse signal to stop the article with high precision in a predetermined stop position.

23 Claims, 9 Drawing Sheets

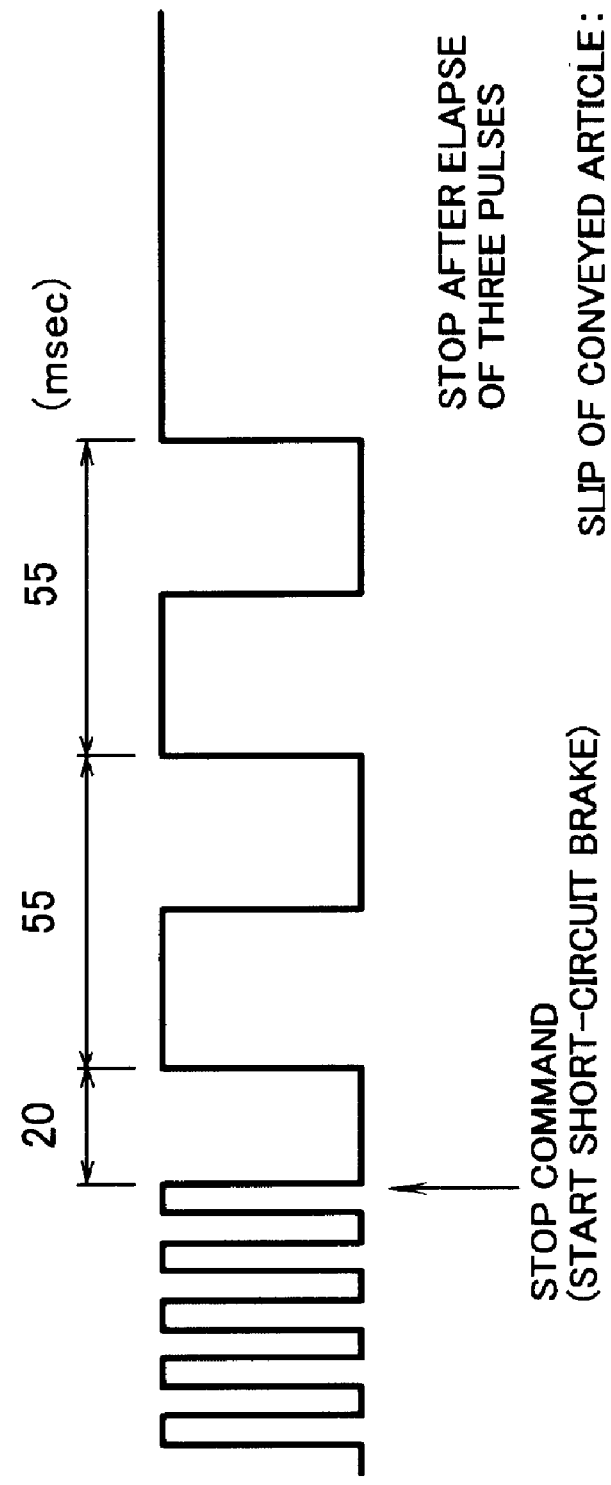
Fig.8 ROTATIONAL PULSE SIGNAL AT STOPPING IN CASE WHERE ONLY A BOX IS CONVEYED

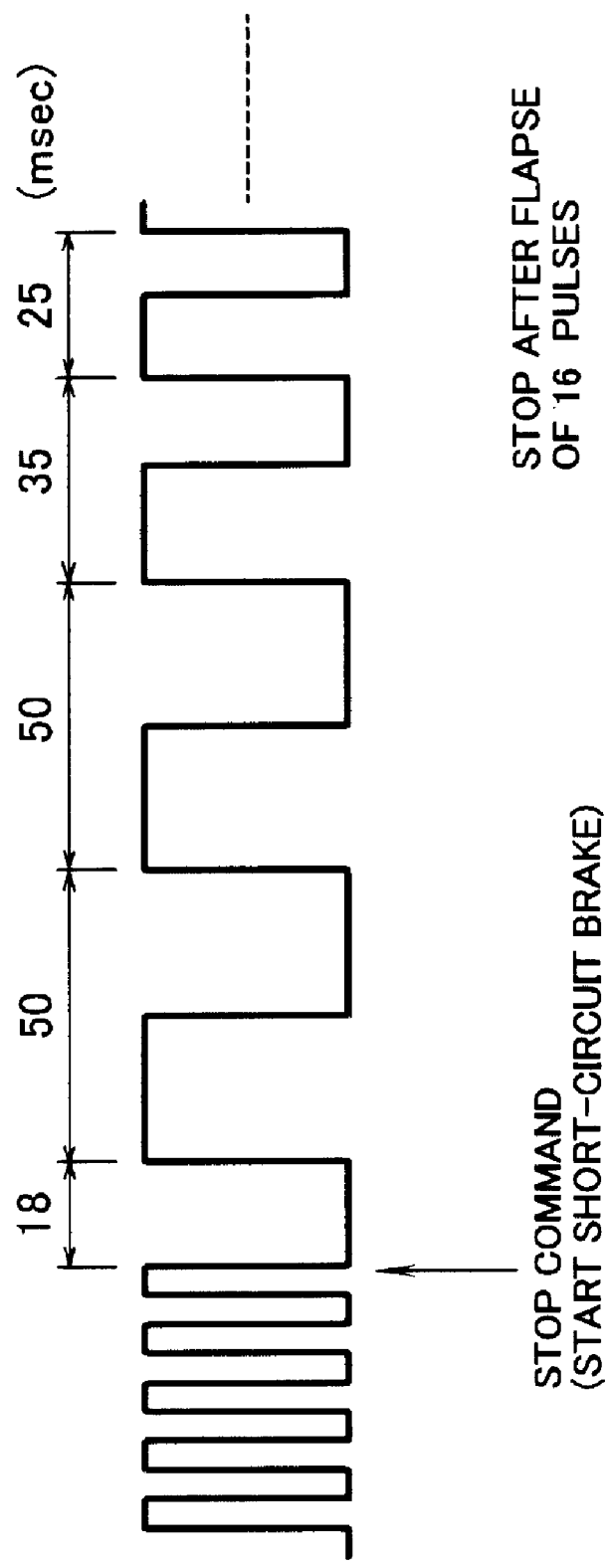
Fig.9 ROTATIONAL PULSE SIGNAL AT STOPPING IN CASE WHERE A PRODUCT OF 30 kg IS CONTAINED IN THE BOX

ZONE CONTROL METHOD IN ROLLER CONVEYOR AND ZONE CONTROLLER

BACKGROUND OF THE INVENTION

1. Field of the Invention

The present invention relates to a zone control method in a roller conveyor which can be suitably applied to a roller conveyor system, and a zone controller.

2. Background Art

An example of conventional roller conveyor systems is one disclosed in JP-A-11-199030 so constructed that a conveyance line is divided into a plurality of control zones, and a zone controller is provided for each of the control zones, to perform zero pressure accumulation (ZPA) type conveyance by zone control.

In the conventional conveyor system, a conveying motor roller and a free roller are provided for each zone, the motor roller and the free roller are connected to each other by a hanging belt wound around each other, and a photoelectric switch for detecting load presence and a zone controller (a drive board) for driving the motor roller are provided for the zone. Each of the zone controllers is so constructed as to rotate and stop the motor roller in response to a load presence signal detected by the photoelectric switch, a driving command signal from the drive board in the upstream zone, and a conveying state signal from the zone controller in the downstream zone.

In order to stop the motor roller, a short-circuit brake is generally used.

When the motor roller is braked by the short-circuit brake, however, a braking torque is approximately constant. Accordingly, the number of rotations of the motor roller until the roller is completely stopped varies, and the position where a conveyed article is stopped, which hereinafter may be called "the actual stop position", is not determined depending on the magnitude of an inertial force due to the difference in the weight of the article. Further, the larger the weight of the conveyed article is, the larger the amount of slip of the article with respect to the roller in a case where the roller is stopped is. This makes it difficult to control the position where the roller is stopped.

FIG. 8 is a pulse waveform diagram showing a rotational pulse signal by a motor contained in a motor roller in a case where only a box containing no product is conveyed and is stopped by a short-circuit brake. FIG. 9 is a pulse waveform diagram showing the rotational pulse signal in a case where a product having a weight of 30 kgf is contained in the box, and the box is conveyed and is stopped by the short-circuit brake. The rotational pulse signal is one in which two pulses are generated every time the motor rotates once, and is generated from an output signal of a magnetic pole position detector such as a Hall element of the motor. The motor roller contains a decelerator with a deceleration ratio of 1 to 11, and is so constructed as to rotate once when the motor rotates 11 times. 22 pulses are generated in the pulse signal every time the motor roller rotates once. It is assumed that the circumferential length of the motor roller is approximately 120 mm. If no slip occurs, the box shall be conveyed by (120/22=) 5.45 mm for each of pulses composing the rotational pulse signal.

As shown in FIG. 8, when only the box is conveyed, it is stopped after an elapse of three pulses since the short-circuit brake was started. The position where the box is stopped is spaced 136 mm apart from the position where the short-circuit brake is started. The amount of slip is (136−3×5.45=) 120 mm. On the other hand, when the product having a weight of 30 kgf is conveyed, as shown in FIG. 9, the box is stopped after an elapse of 16 pulses since the short-circuit brake was started. The position where the box is stopped is spaced 1110 mm apart from the position where the short-circuit brake was started. The amount of slip is (237−16× 5.45=) 150 mm.

In a case where the position where the box is stopped thus varies depending on the weight of the conveyed article, when the motor roller is started again to start the conveyance, a time period elapsed until the conveyed article is moved to the subsequent zone differs. Accordingly, zero pressure accumulation type conveyance is interfered with. Therefore, smooth conveyance cannot be performed. Further, the conveyed articles may collide with each other unless a clearance is given between the articles.

SUMMARY OF THE INVENTION

An object of the present invention is to make it possible to stop, in a roller conveyor system for carrying out zone control, a conveyed article at an approximately constant position without varying the position where the article is stopped in a desired control zone even if the weight of the article varies.

In order to attain the above-mentioned object, the present invention takes the following technical measures.

Specifically, the present invention is directed to a roller conveyor system for carrying out zone control, characterized in that in stopping an article in a predetermined control zone, such stop control is carried out that the conveyed article is stopped with high precision at a predetermined stop position by decelerating and stopping a motor in a plurality of braking systems. Consequently, it is possible to perform a stable zero pressure accumulation operation and separate articles. Accordingly, highly precise positioning is allowed irrespective of the weight of the article. Therefore, it is easy to read and classify the articles.

Preferably, a load presence sensor is provided at the center in the direction of conveyance of the control zone, thereby making it possible to carry out the stop control irrespective of whether the direction of conveyance is a forward direction or a reverse direction. Further, it is possible to set the stop position on the basis of the number of pulses composing a rotational pulse signal which is proportional to the number of rotations of the motor. Even if the stop control is started from a certain point at a certain distance to the predetermined stop position, therefore, the conveyed article can be accurately stopped at the predetermined stop position with relatively high precision. Further, the precision of the stop position can be enhanced while decreasing the number of sensors.

A motor is an electric equipment for converting electrical energy (electric power) into mechanical energy (mechanical power), and such state is an electrically-driven state. However, the motor becomes a generator or a brake in its connected state depending on its manner of use. An electricity-generating state, an electrically-driven state and a braking state are generally called three states of the motor.

In a self-excited drive motor having a predetermined main magnetic flux, for example, a DC motor or a blushless motor, the three states of the motor are defined as follows. That is, the electricity-generating state is a state where mechanical power is converted into electric power at the power supply (that is, a state where when a rotor is rotated at a speed of not less than no-load angular velocity (generally zero) by an external force, a part of the mechanical power supplied to the rotor is outputted as electric power). The electrically-driven state is a state where electric power is converted into mechanical power and the mechanical power is applied to a load (that is, a state where when a positive constant torque load which is not more than a starting torque is connected to a rotor, a part of electric power supplied to the motor is applied to the load as mechanical power). The braking state is a state where a braking function is produced in a rotor by consuming mechanical power and electric power (that is, a state where when a rotor is rotated in the reverse direction by an external force, both mechanical power applied to the rotor and electric power applied by the power supply are consumed by a resistor of a motor armature circuit and converted into heat).

A motor braking system can be switched by switching the state of the motor. In the case of the electrically-driven state, mechanical power is applied to a load (a conveyed article). However, a part of switching of the braking system in the present invention may include an electrically-driven state.

DETAILED DESCRIPTION OF THE INVENTION

The present invention can be embodied as a zone control method in a roller conveyor which is divided into a plurality of control zones arranged in the direction of conveyance and has conveying drive rollers driven by a motor provided in the respective control zones. The motor may be contained in the conveying drive roller, that is, a motor roller may be used as the drive roller. Alternatively, the motor and the drive roller maybe separately provided, and an output shaft of the motor and the drive roller may be interlocked by a suitable rotation transmitting mechanism. Each of the control zones may be constituted by independent conveyor units. A roller conveyor may be constructed by connecting the plurality of conveyor units to one another. Alternatively, one of the conveyor units may be divided into a plurality of control zones. It is preferable that each of the control zones is provided with a zone controller for controlling the motor. However, each of the zones may be controlled by a centralized controller comprising a plurality of control signal output terminals, for example, a programmable controller (P.L.C.). When each of the control zones is provided with the zone controller, it is preferable that the controller in the certain control zone is so constructed that various types of signals can be transmitted and received between the zone controller on the upstream side thereof and the zone controller on the downstream side thereof. For example, a detection signal of a load presence sensor provided in each of the zones is transmitted and received between the zone controllers, thereby making it possible for each of the zone controllers to judge whether or not the motor in the zone should be driven. Accordingly, it is possible to perform at least zero pressure accumulation type conveyance even if no host controller exists.

The zone control method comprises the step of controlling the stop of the motor when predetermined stop control start conditions are satisfied during the conveying operation of the conveying drive roller provided in the predetermined control zone. The stop control is for switching a braking force of the motor depending on the rotational speed of the motor. Such stop control may be carried out in all the control zones. If the control zone where a conveyed article may be stopped is previously determined, the stop control can be also carried out in one or some of the control zones. When various operation modes such as a high speed operation mode, a normal operation mode, a low speed operation mode, and an intermittent operation mode exist as a conveyance mode of the drive roller, the stop control may be carried out when the article is stopped from a conveying state in any of the operation modes. Alternatively, the stop control may be carried out only in one or some of the operation modes. Further, a braking force can be switched in various manners during the stop control. For example, it is possible to not only switch any one of a strong braking force, a weak braking force, and a zero braking force but also switch the state to a state where a negative braking force, that is, a predetermined driving torque is produced in the motor. The rotational speed of the motor can be judged from a rotor position signal of the motor. When the motor is a blushless DC motor containing a Hall element, a rotational pulse signal is generated from an output signal of the Hall element. On the basis of the rotational pulse signal, it is possible to judge the rotational speed of the motor.

According to the zone control method in the present invention, when the rate of reduction in the rotational speed of the motor after starting the stop control is relatively low, and the drive roller is rotated owing to the inertia of the article, the braking force of the motor is increased by judging such a state from the rotational speed of the motor, thereby making it possible to shorten the distance from the position where the stop control is started to the actual stop position in a case where the weight of the article is relatively heavy to reduce the variation in the stop position.

The stop control can comprise the step of subjecting the motor to relatively weak braking, and the step of subjecting the motor to relatively strong braking when the rotational speed of the motor is increased by a rotating force arising from the inertia of an article which is conveyed on the conveyor after the rotational speed of the motor is reduced once. The above-mentioned circumstances occur when the article slips with respect to the drive roller by the relatively weak braking. That is, the rotational speed is temporarily reduced because the drive roller slips with respect to the article. Thereafter, when the article is stalled by dynamic friction between the article and the roller so that an inertial force is weakened, the grip of the roller with the article is recovered. The rotation of the roller is accelerated by the inertial force of the article, so that the rotational speed of the motor is increased again. At this time, the braking force of the motor is strengthened, thereby making it possible to effectively stall the article and to reduce the variation in the actual stop position due to the difference in the weight. Further, when the strong braking is performed from the beginning, the amount of slip of the conveyed article is further increased. However, the strong braking is performed after the grip of the roller with the article is recovered, thereby making it possible to decrease the variation in the distance from the position where the stop control is started to the actual stop position while making the amount of slip as small as possible. The amount of slip is reduced, thereby making it possible to also improve the precision of the stop position control based on the number of pulses, described later. Even when the rotational speed of the motor immediately after starting the stop control is relatively high, the step of subjecting the motor to relatively strong braking can be also temporarily carried out.

The stop control can comprise the step of braking the motor, and the step of operating the motor at low speed. Much time is assigned to the step of braking the motor when the rotational speed of the motor is relatively high, while being assigned to the step of operating the motor at low speed when the rotational speed of the motor is relatively low. Even in the case where a relatively heavy article is conveyed, therefore, when the rotational speed of the motor is reduced to such a low speed that it can be stopped immediately by a short-circuit brake, the article can be conveyed to a desired stop position by operating the motor at the low speed (by applying a negative braking force), and a very light article to be conveyed can be also moved to a predetermined stop position, so that the variation in the actual stop position depending on the difference in the weight can be significantly reduced. A load presence sensor is provided at a position where it is desired to be stopped, or the rotational pulse signal is counted, thereby making it possible to detect that the article is conveyed to the stop position and to immediately stop the article which is being moved at low speed at the position. The time may be assigned to each of the steps in any manner. For example, it can be assigned by measuring a predetermined time period from the time when the rotational pulse signal rises or the time when it falls, and switching the braking of the motor and the low speed operation thereof depending on whether or not the rotational pulse signal is reversed after an elapse of the predetermined time period.

The stop control comprises the step of subjecting the motor to relatively weak braking, the step of subjecting the motor to relatively strong braking when the rotational speed of the motor is increased by the rotating force arising from the inertia of the article which is conveyed on the conveyor after the rotational speed of the motor is reduced once, and the step of operating the motor at low speed. It is also possible to assign much time to the step of braking the motor when the rotational speed of the motor is relatively high, while assigning much time to the step of operating the motor at low speed when the rotational speed of the motor is relatively low. It is preferable that the step of subjecting the motor to strong braking is carried out temporarily.

The weak braking can be performed by subjecting the motor to short-circuit braking, and the strong braking can be performed by subjecting the motor to plugging.

An AC motor may be used as the motor in the present invention. However, preferably a DC motor and more preferably, a blushless DC motor may be used. It is possible to generate a rotational pulse signal from an output signal of a magnetic pole detector of the motor, and judge the rotational speed of the motor on the basis of the rotational pulse signal. An example of the magnetic pole detector is a Hall element used for the blushless DC motor. The judgment of the rotational speed of the motor based on the rotational pulse signal can be made in a suitable method. For example, it is possible to measure the spacing between pulses composing the rotational pulse signal and the period of the pulses using a high-frequency oscillation circuit and a counter and judge the rotational speed from the results of the measurement. Further, it is also possible to judge the rotational speed using a microcomputer. In the present invention, the judgment of the rotational speed is not one required to find the rotational speed by an operation but one also including indirect judgment from the number of rotations per unit time, the pulse width per unit time, or the like.

It is preferable that the operating state of the motor is updated for each of pulses composing the rotational pulse signal during the stop control. This makes it possible to further improve the precision of the actual stop position. The timing of updating the operating state within one pulse is not limited to predetermined timing in cases such as a case where the pulse rises or a case where the pulse falls. The operating state may be updated at proper timing within one pulse.

It is preferable that the stop control is carried out until the rotational pulse signal counts a predetermined number of pulses from the time when the stop control is started, and completely stops the motor by a short-circuit brake after the stop control is terminated. Consequently, it is possible to stop the article with high precision at a predetermined position on the downstream side of the control zone (an outlet) by rotating the motor and the drive roller until a predetermined number of pulses is counted even when the weight of the article is relatively heavy or relatively light.

Furthermore, it is also possible to operate the motor at low speed until the article is conveyed to a predetermined position in the direction of conveyance in a predetermined control zone where the stop control is carried out after the stop control is terminated, and then completely stop the motor by the short-circuit brake. This makes it possible to decelerate even the heavy article to a low speed state at a relatively short distance because the above-mentioned stop control is carried out before the article is conveyed at low speed to a predetermined stop position. Thereafter, the motor is conveyed at low speed to a predetermined position and is stopped by the short-circuit brake, thereby further improving the precision of the actual stop position.

It is preferable that the predetermined number of pulses is larger than the number of pulses composing the rotational pulse signal from the time when the short-circuit brake is started to the time when it is completely stopped in a case where an article having a predetermined weight which is conveyed on the conveyor is completely stopped by the short-circuit brake. More preferably, the number of pulses composing the rotational pulse signal from the time when the short-circuit brake is started to stop an article to the time when the article is completely stopped in a case where the article has the maximum weight which is expected to be conveyed on the conveyor is previously measured by a test, and the number of pulses is used as a predetermined number of pulses. Consequently, it is possible to prevent the heavy article from being located beyond the predetermined stop position while counting the predetermined number of pulses.

The zone stop control method according to the present invention can comprise the step of reversing the conveying drive roller, considering as a requirement the condition that the article is positioned beyond the predetermined position in the direction of conveyance in the predetermined control zone where the stop control is carried out. Such a step may be incorporated into the stop control, or may be a step independent of the stop control. Consequently, the article may, in some cases, be located beyond the predetermined stop position in cases such as a case where the amount of slip of the article with respect to the roller is large. However, the conveying drive roller is reversed by detecting such circumstances to convey the article in the reverse direction, thereby making it possible to stop the article in a predetermined stop position.

Preferably at least the fact that the state transition of a load presence signal indicating whether or not the article exists at the center in the direction of conveyance of the predetermined control zone where the stop control is carried out occurred is included as predetermined stop control start conditions. Consequently, the braking is started when the article is conveyed to the center in the direction of conveyance. Accordingly, a distance for carrying out the stop control can be ensured until the article leads to the predetermined stop position at a downstream end. Accordingly, the actual stop position can be controlled with high precision without performing excessive braking. Further, even when the direction in which the article is conveyed on the conveyor line is conversely set, the same stop control can be carried out only by changing the setting of the controller without reassembling the entire line.

The above-mentioned stop control method can be carried out in various apparatuses and systems. However, it can be suitably used preferably by using a zone controller, described below. A suitable example of the circuit structure of the zone controller is as shown in FIG. 2. The detailed description of the present embodiment will be described later.

A zone controller according to the present invention is a zone controller in a predetermined control zone of a roller conveyor line which is divided into a plurality of control zones arranged in the direction of conveyance, for carrying out driving and braking control of a DC motor for rotating a conveying drive roller provided in the predetermined control zone. The DC motor includes a blushless DC motor and any of other various types of DC motors. It is preferable that a roller containing a motor is utilized as the drive roller and the motor. The zone controller may be one comprising an input terminal of a conveyance start command signal (P.L.C. RUN/STOP) for the entire line from a management controller, a conveyance direction signal (CW/CCW), or the like. Further, the zone controller can be so constructed that zero pressure accumulation type conveyance can be performed by carrying out distributed control which is independent for each control zone even if the management controller does not exist.

The zone controller according to the present invention can comprise a control circuit; a drive circuit for outputting a control current to the motor on the basis of a control signal from the control circuit; a first detection signal input terminal for inputting a detection signal of a first sensor for detecting whether or not an article is conveyed to a first position in the direction of conveyance in the predetermined control zone; and a magnetic pole position signal input terminal for inputting an output signal of a magnetic pole detector of the motor. The control circuit can be constituted by a digital circuit using a CMOS (Complementary Metal-Oxide Semiconductor) IC, a differentiation circuit, an integration circuit, or the like, or may be one for carrying out microcomputer control. Further, the drive circuit carries out feedback control on the basis of a magnetic pole position detection signal of the motor, thereby making it possible to produce a control current for subjecting a motor rotator to constant speed rotation, constant torque rotation, or the like and to produce a control current for performing braking such as plugging or short-circuit braking. As the above-mentioned sensor, either a contact type sensor or a non-contact type sensor such as a photoelectric sensor may be used. The position where the sensor is provided can be a suitable position such as each of right and left ends in the width direction of a roller or a clearance between rollers. Further, a load detection type sensor may be provided in the roller itself. A Hall element can be suitably used as a magnetic pole detector of the motor. Further, it is preferable that each of the input terminals is constituted by a connecting terminal to and from which wiring is attachable or detachable. However, it may be one to which wiring to the sensor, the motor, or the like is fixedly connected. Various types of control currents to the motor may be used as a control current. In the case of the motor having a three-phase winding driving coil, three output signal lines may be provided, to supply a current having an AC waveform corresponding to a desired operating state of the motor to each of the signal lines.

The control circuit comprises stop control means started, considering as a requirement the condition that the state transition of the detection signal of the first sensor occurs, and the stop control means can be so constructed as to generate the control signal such that a braking force of the motor is switched on the basis of a rotational pulse signal generated from a magnetic pole position signal, that is, an output signal of a magnetic pole detector. The detection signal of the first sensor may be one which is brought into an H level at the time of detecting the article, while being brought into an L level at the time of undetecting the article, or may be one which is brought into an L level at the time of detecting the article, while being brought into an H level at the time of undetecting the article. The stop control means may be one composed of a logic circuit. In this case, the stop control means can be started by setting a Q output of a D flip-flop, for example. When the control circuit is mainly composed of a microcomputer, the stop control means can be composed of a program which is processed by the computer. In this case, the stop control means can be started by starting the execution of the program. The rotational pulse signal can be generated by pulling out any one of output signals of a magnetic pole position detector such as a Hall element. In this case, in the case of a four-pole motor, a two-pulse rectangular signal can be generated every time the motor rotates once. In the case of an eight-pole motor, a four-pulse rectangular signal can be generated every time the motor rotates once. The braking force of the motor can be switched by changing the contents of the control signal. The control signal can be normally composed of not a single signal but a combination of a plurality of signals such as a RUN signal (a conveyance signal), a CW/CCW signal (a forward/reverse signal), and a conveying speed command signal. When the driving control in the drive circuit is mainly composed of a microcomputer, a command signal composed of a plurality of bits can be, of course, also taken as a control signal. In this case, it can be said that each of bits composing the command signal corresponds to each of the signals.

According to the zone controller in the present invention, the stop control can be started in cases such as a case where it is detected that the article is conveyed to a predetermined position in the direction of conveyance of the control zone and, for example, another article exists in a downstream control zone. In the stop control, the braking force can be switched depending on the reduction in the rotational speed of the motor, to restrain the variation in the stop position.

In the above-mentioned zone controller, a conveyance signal and a forward/reverse signal can be included among control signals supplied from the control circuit to the drive circuit. Further, the drive circuit can be so constructed as to output to the motor the control current for braking the motor by a short-circuit brake when the conveyance signal is off, while outputting to the motor the control current for driving the motor in a direction indicated by the forward/reverse signal when the conveyance signal is on. The conveyance signal may be on when it is at an H level and may be off when it is at an L level. The stop control means comprises short-circuit brake signal generation means for turning the conveyance signal off, plugging signal generation means for turning the conveyance signal on and bringing the forward/reverse signal into a reversed state, and can be so constructed that the generation of the control signal by the plugging signal generation means precedes the generation of the control signal by the short-circuit brake signal generation means. When the short-circuit brake signal generation means and the plugging signal generation means are composed by logic circuits, the above-mentioned priority construction is obtained by assembling a logic such that an output signal of the plugging signal generation means is used as a control signal irrespective of an output signal of the short-circuit brake signal generation means. When each of the generation means is composed of a program executed by the microcomputer, programming is possible such that plugging signal generation conditions are given priority to generate a plugging signal.

According to such a zone controller, the plugging signal generation means and the short-circuit brake signal generation means are separately constructed, to give priority to the plugging signal while simplifying the design and the structure of each of the generation means, thereby making it possible to apply plugging accurately and quickly without shifting timing at which the motor rotated by the inertia of the article is subjected to strong braking.

In the above-mentioned zone controller, a conveyance signal and a conveying speed signal can be included among control signals supplied from the control circuit to the drive circuit. The drive circuit can be so constructed as to output to the motor the control current for braking the motor by a short-circuit brake when the conveyance signal is off, while outputting to the motor the control current for driving the motor at a rotational speed corresponding to the conveying speed signal when the conveyance signal is on. The stop control means can comprise low speed switching means for switching the conveying speed signal to a low speed state when it is started, and short-circuit brake signal generation means for turning the conveyance signal on or off on the basis of the pulse waveform of the rotational pulse signal. The low speed switching means can be composed of an RS flip-flop, for example. Alternatively, it can be also composed of a flag region ensured in a RAM in the case of microcomputer control and its setting change program.

In the above-mentioned zone controller, a conveyance signal, a conveying speed signal, and a forward/reverse signal are included as control signals supplied from the control circuit to the drive circuit. The drive circuit is so constructed as to output to the motor the control current for braking the motor by a short-circuit brake when the conveyance signal is off, while driving the motor at a rotational speed corresponding to the conveying speed signal and outputting to the motor the control current for driving the motor in a direction indicated by the forward/reverse signal when the conveyance signal is on. The stop control means comprises low speed switching means for switching the conveying speed signal to a low speed state when it is started, short-circuit brake signal generation means for turning the conveyance signal on or off on the basis of the pulse waveform of the rotational pulse signal, and plugging signal generation means for turning the conveyance signal on and bringing the forward/reverse signal into a reversed state, and can be so constructed that the generation of the control signal by the plugging signal generation means precedes the generation of the control signal by the short-circuit brake signal generation means.

Preferably, a blushless DC motor may be used as the motor. A signal representing the rotational speed of the motor can be a rotational pulse signal generated from an output of a Hall element of the motor.

The stop control means can be so constructed as to update a control signal to be outputted to the drive circuit for each of pulses composing the rotational pulse signal. Such construction is possible so as to detect the pulse width using a counter reset by the state transition of the pulse and a high-frequency oscillation circuit, for example, and update the control signal on demand depending on the pulse width.

The stop control means can be so constructed as to generate a control signal for braking the motor by the short-circuit brake when the rotational pulse signal counts a predetermined number of pulses from the time when it is started.

It is preferable that the zone controller comprises a second detection signal input terminal for inputting a detection signal of a second sensor for detecting whether or not the article is conveyed to a second position in the direction of conveyance in the predetermined control zone, and is so constructed that the second position is on the downstream side of the first position in the direction of conveyance, and the motor is not braked by the short-circuit brake until the detection signal which shows that the article is conveyed to the second position is outputted by the second sensor after the predetermined number of pulses is counted.

The predetermined number of pulses may be set to a number larger than the number of pulses composing the rotational pulse signal from the time when the short-circuit brake is started to the time when an article having a predetermined weight which is conveyed on the conveyor is completely stopped by the short-circuit brake.

The zone controller further comprises a third detection signal input terminal for inputting a detection signal of a third sensor for detecting whether or not the article is conveyed to a third position in the direction of conveyance in the predetermined control zone, and can be so constructed that the third position is on the downstream side of the first position in the direction of conveyance, and the control circuit generates a control signal for reversing the motor, considering as a requirement the condition that the article is beyond the third position. It is preferable that the third position is on the downstream side of the second position in the direction of conveyance.

It is preferable that the zone controller further comprises an upstream connecting terminal to another zone controller on the upstream side, a downstream connecting terminal to another zone controller on the downstream side, and a connecting terminal to a host controller, and is so constructed that the upstream connecting terminal comprises at least an output terminal of the detection signal of the first sensor, and an input terminal of the detection signal of the first sensor in an upstream control zone, the downstream connecting terminal comprises at least an output terminal of the detection signal of the first sensor, and an input terminal of the detection signal of the first sensor in a downstream control zone, and the control circuit comprises conveyance start signal generation means for generating a conveyance start signal from the detection signal of the first sensor and the detection signals of the first sensors in the upstream and downstream control zones, the conveyance of the conveying drive roller being started by the state transition of the conveyance start signal. Consequently, zero pressure conveyance control and the above-mentioned stop control can be carried out only by a sensor logic, thereby making it possible to increase the flexibility of the design of the entire roller conveyor system as well as reduce the facility cost of the entire system.

The foregoing and other objects, features, aspects and advantages of the present invention will become more apparent from the following detailed description of the present invention when taken in conjunction with the accompanying drawings.

BRIEF DESCRIPTION OF THE DRAIWNGS

FIG. 8 is a timing chart of a rotational pulse signal in a case where braking is performed by a short-circuit brake at the time of conveying only a box by conventional conveyor control; and FIG. 9 is a timing chart of a rotational pulse signal in a case where braking is performed by a short-circuit brake at the time of conveying an article having a weight of 30 kgf by conventional conveyor control.

DESCRIPTION OF THE PREFERRED EMBODIMENTS

An embodiment of the present invention will be described on the basis of the drawings.

Figure 4:
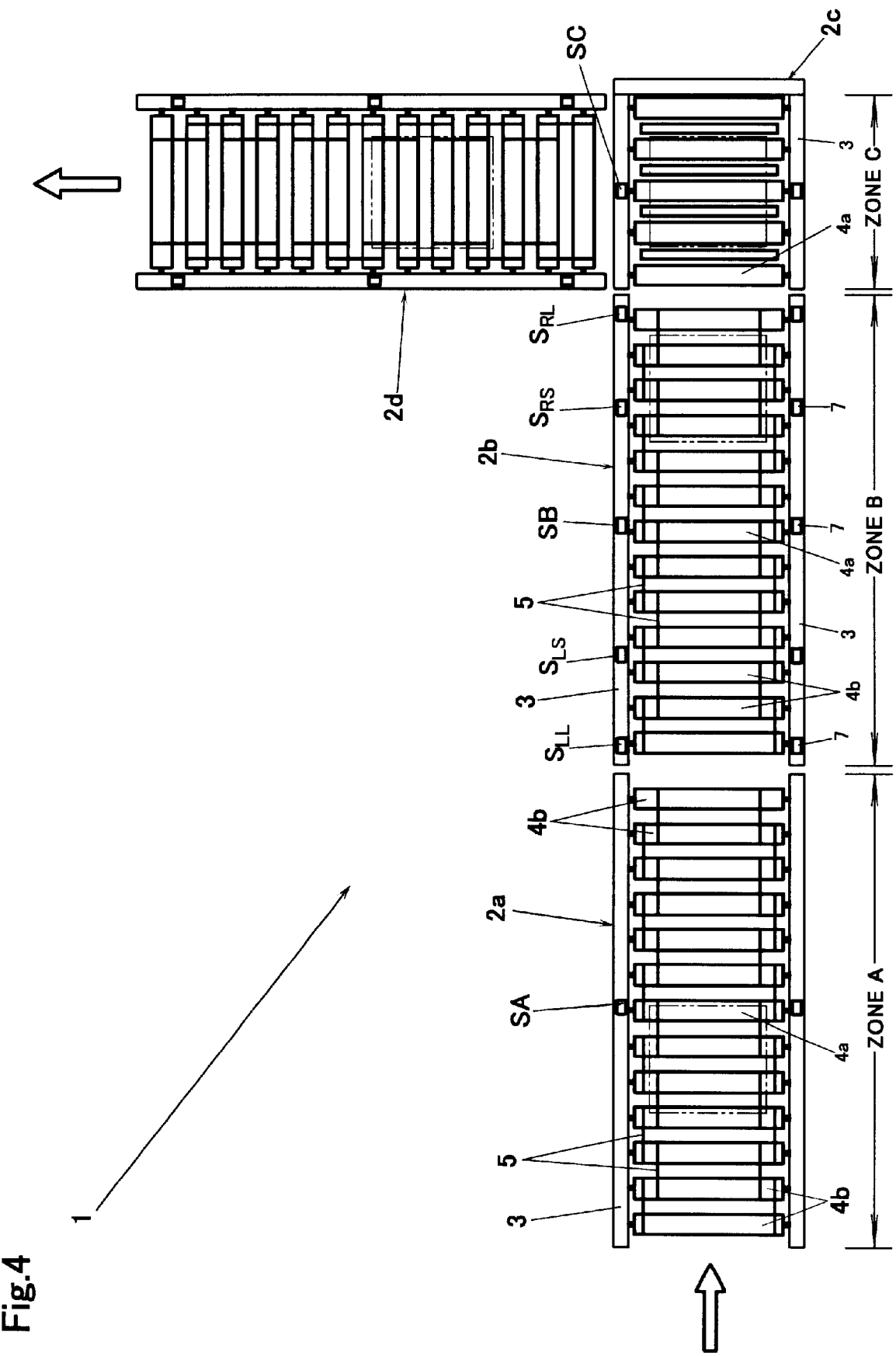
FIG. 4 is a plan view of the whole of a roller conveyor using the zone controller.

FIG. 4 illustrates an example of a roller conveyor system 1 to which a zone control method and a zone controller according to an embodiment of the present invention are suitably applied, which comprises two conveyance lines perpendicular to each other. The first conveyance line is divided into a plurality of control zones including a zone A, a zone B, and a zone C, and the control zones A, B, and C respectively have conveyor units 2a, 2b, and 2c. The second conveyance line comprises a conveyor unit 2d connected to the conveyor unit 2c at a downstream end of the first conveyance line. The conveyor unit 2c at the downstream end comprises a cross feeder disclosed in JP-A-6-312832 by the applicant of the present invention and a transverse feeder which is the same as a cross feeder disclosed in Japanese Patent Application No. 10-356904 (corresponding PCT application PCT/JP99/06669). The transverse feeder makes it possible to deliver an article from the first conveyance line to the second conveyance line. An operating state of each of the lines is managed by a host controller such as P.L.C. (not shown). From the host controller to each of the lines, command signals such as a RUN/STOP signal indicating whether the line is operated or stopped and a CW/CCW signal indicating the direction of conveyance are supplied. The operation of the whole of each of the lines is controlled on the basis of the command signals. In the control zones, the operating states are individually controlled on the basis of detection signals of various types of sensors, signals from upstream and downstream zones, and so forth, to realize zero pressure accumulation.

Each of the other conveyor units 2a, 2b, and 2d excluding the conveyor unit 2c in a connection between the lines is one in which a plurality of conveyance rollers 4 for conveying the article are supported rotatably with predetermined spacing in the direction of conveyance between a pair of right and left side frames 3 arranged parallel to each other. The conveying rollers 4 include an idle roller 4b freely rotating and a motor roller 4a (a conveying drive roller) containing a motor. The adjacent conveying rollers 4 are interlocked by a transmission belt 5, to transmit to the idle roller 4b a rotating force of the motor roller 4a. In the present embodiment, one motor roller 4a is arranged at the center of the unit, and the others are taken as idle rollers 4b.

Out of the control zones constituting the first conveyance line, stop control is carried out in the zone B in the present embodiment. It goes without saying that the same stop control is carried out in all the control zones.

In the control zone B where the stop control is carried out, a first load presence sensor SB, second load presence sensors $S_{LS}$ and $S_{RS}$, and third load presence sensors $S_{LL}$ and $S_{RL}$ are provided on the side frame 3. A photoelectric sensor can be used as the sensors. Light emitting devices 7 such as a light emitting diode and an infrared diode are provided on the side frame 3 on the opposite side. When the article is conveyed, therefore, light from the light emitting device 7 is intercepted so that the photoelectric sensor is turned on or off, thereby making it possible to detect that the article is conveyed to a predetermined position.

The first sensor SB is provided in a position (a first position) at the center in the direction of conveyance of the control zone B, to detect whether or not a leading end of the article has reached to the position at the center in the direction of conveyance of the control zone B. The conveyor units 2a and 2c in the zones A and C are respectively provided with load presence sensors SA and SC which are the same as the first sensor SB. The first sensor SB outputs an ON (High level) signal when the presence of the article is detected, while outputting an OFF (Low level) signal when it is not detected.

Although the second sensors $S_{LS}$ and $S_{RS}$ and the third sensors $S_{LL}$ and $S_{RL}$ are respectively disposed on the upstream and downstream sides of the conveyor unit 2b, either of the second sensors and either of the third sensors are used depending on the direction of conveyance. Although the direction of conveyance is set such that the article is conveyed rightward from the left, as illustrated, the detection signals of the second sensor $S_{RS}$ on the right side and the third sensor $S_{RL}$ on the right side are used. On the other hand, when the direction of conveyance is reversed, the detection signals of the second sensor $S_{LS}$ on the left side and the third sensor $S_{LL}$ on the left side are used.

The second sensors $S_{LS}$ and $S_{RS}$ detect whether or not the leading end of the article passes through an intermediate portion in the direction of conveyance of the control zone B, to detect that the article is conveyed to a second position on the downstream side of the first position in the direction of conveyance. When the detection signals of the second sensors $S_{LS}$ and $S_{RS}$ are used, it is possible to carry out control such that the leading end of the article is positioned between the second sensor and the third sensor irrespective of the size of the article. The third sensors $S_{LL}$ and $S_{RL}$ detect whether or not the leading end of the article leads to the downstream end in the direction of conveyance of the control zone B, to detect whether or not the article is conveyed to a third position on the downstream side of the first position and the second position in the direction of conveyance.

Figure 5:
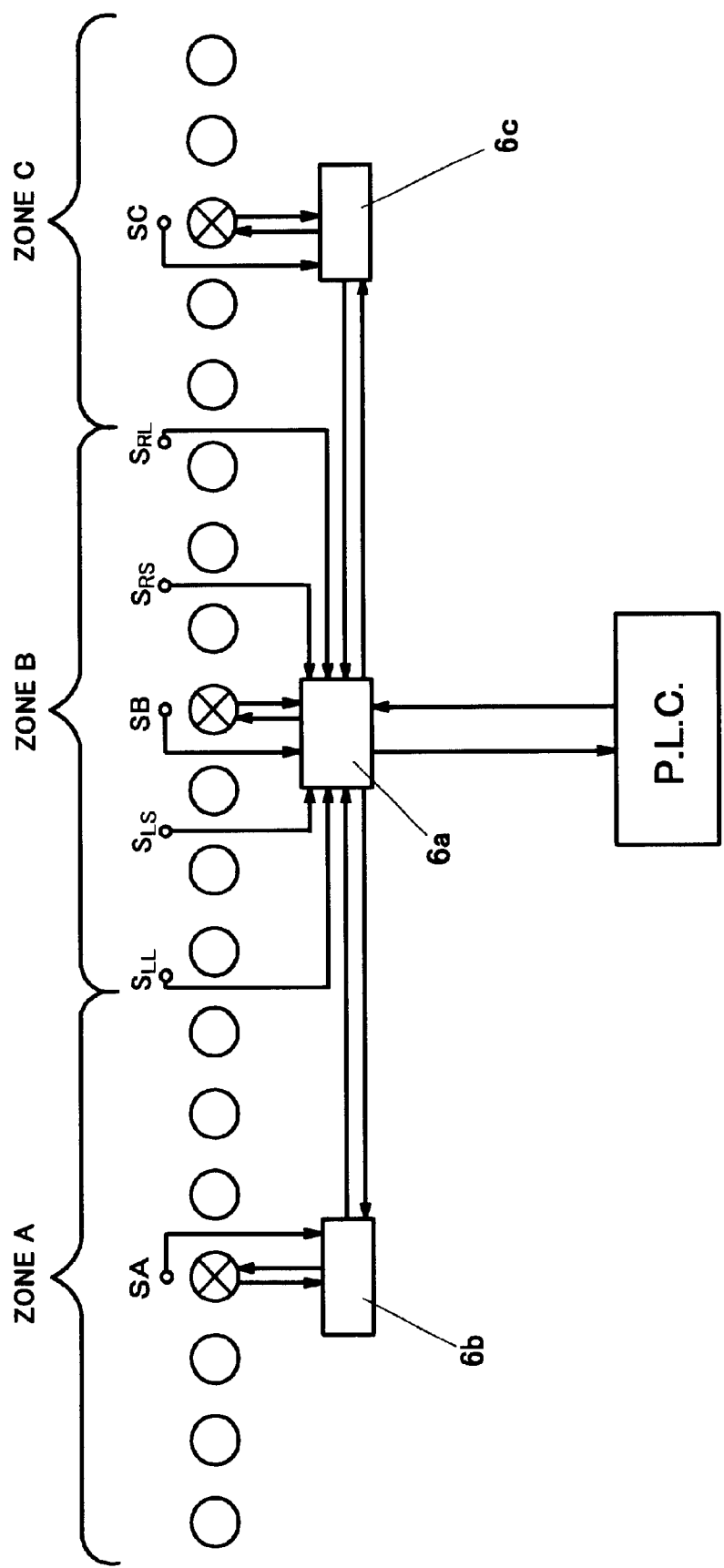
FIG. 5 is a schematic view of wiring of the roller conveyor.
Figure 6:
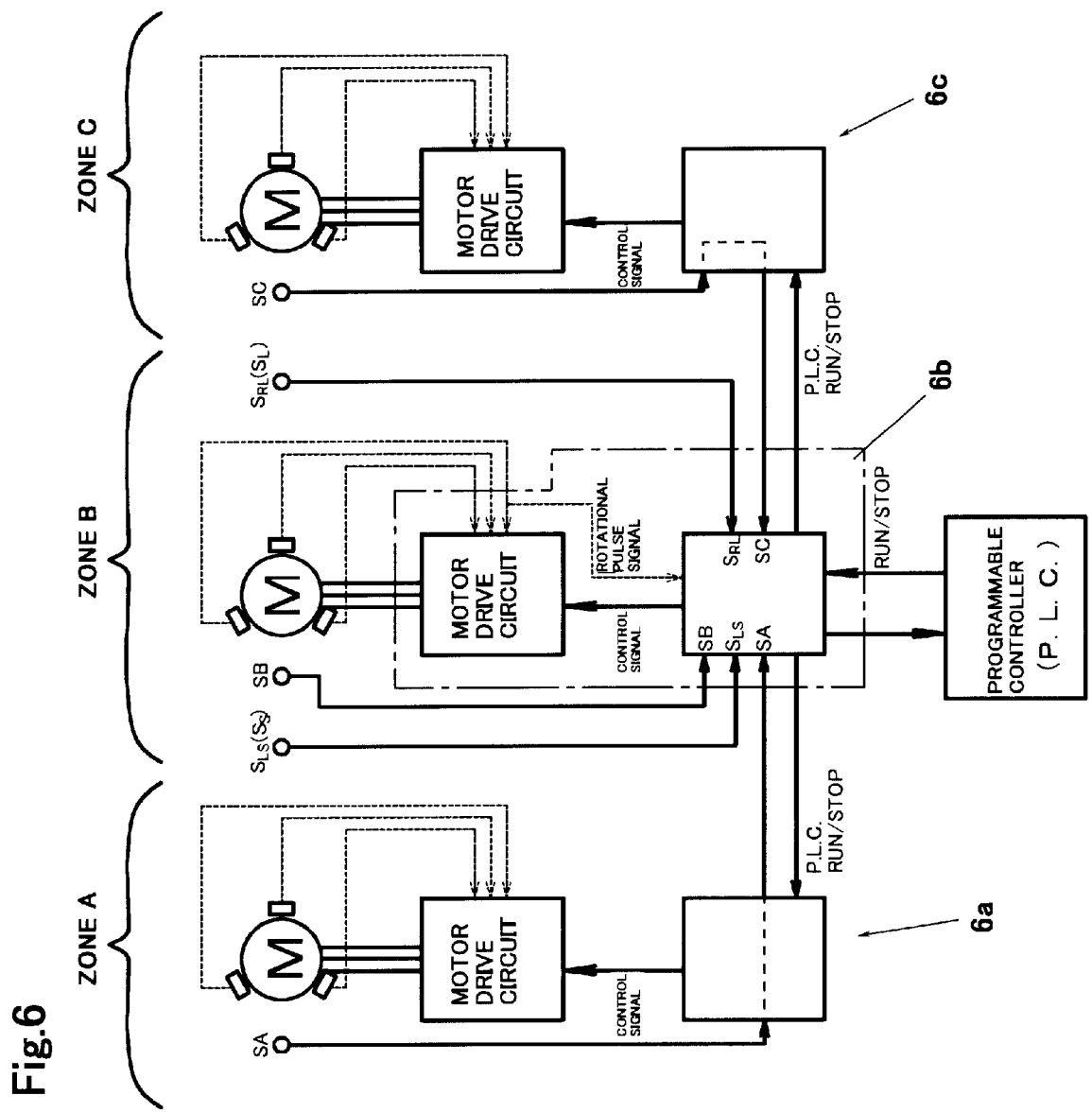
FIG. 6 is a schematic view of a configuration showing the flow of signals in the roller conveyor.

The conveyor units 2a, 2b, and 2c respectively comprise zone controllers 6a, 6b, and 6c for carrying out driving control of the motor rollers 4a, as also illustrated in FIG. 5. The zone controllers 6 are connected to one another such that each of the zone controllers can transmit and receive each type of signal to and from the upstream and downstream zone controllers. Although the signal which can be transmitted and received can be a desired signal, the command signal (the RUN/STOP signal and the CW/CCW signal) from the host controller (P.L.C.) and the detection signal of the first sensor in each of the zones can be transmitted and received to and from the zone controller in the other zone, as also illustrated in FIG. 6. When the host controller is connected to the zone controller 6 in any one of the conveyor units constituting the first conveyance line, the command signal from the host controller is also transmitted to the other zone controller 6 belonging to the line. Although the zone controllers 6 may respectively have different configurations, controllers having the same configuration can be also used.

Figure 1:
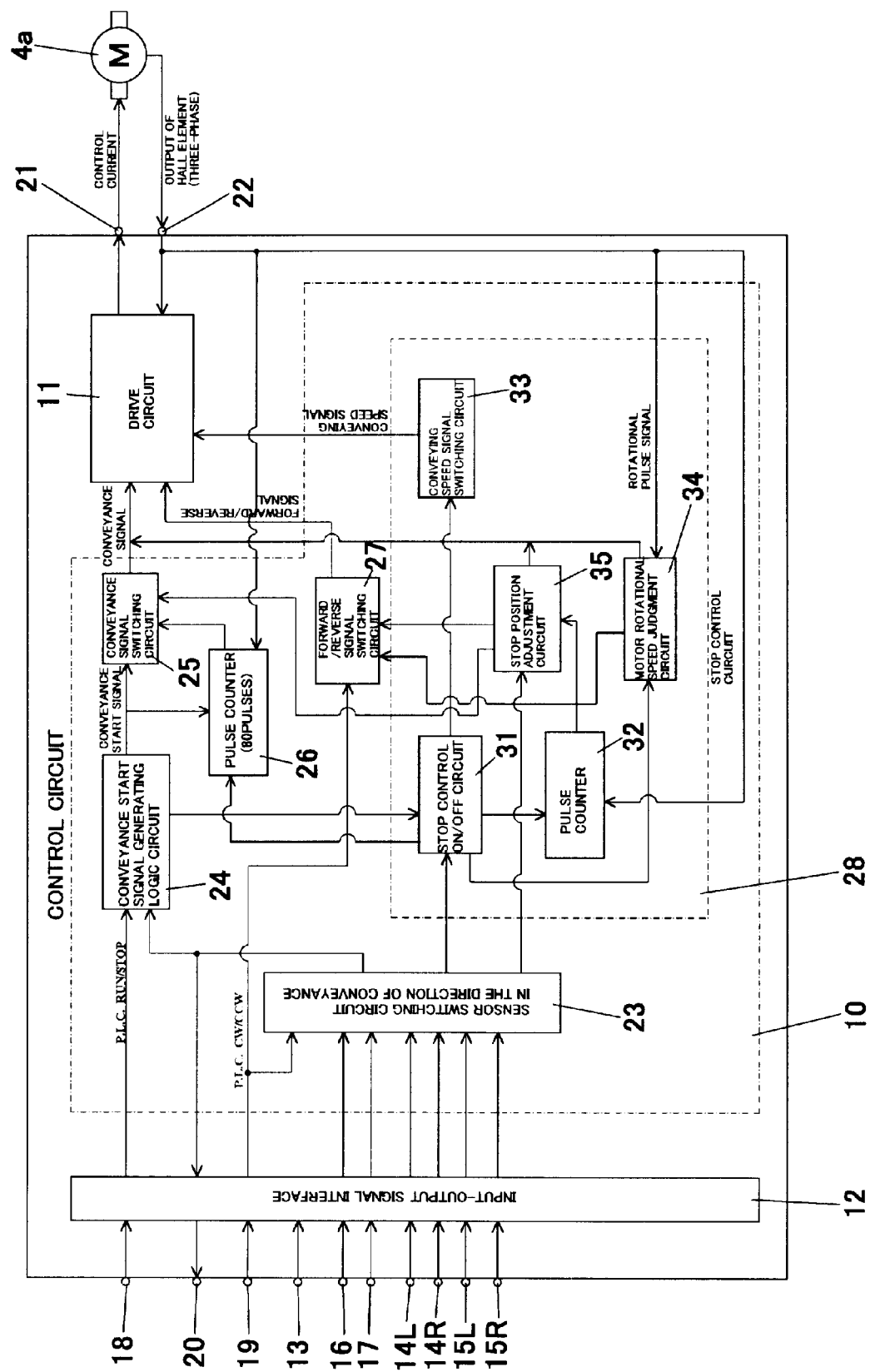
FIG. 1 is a schematic block diagram of a zone controller according to an embodiment of the present invention.
Figure 2:
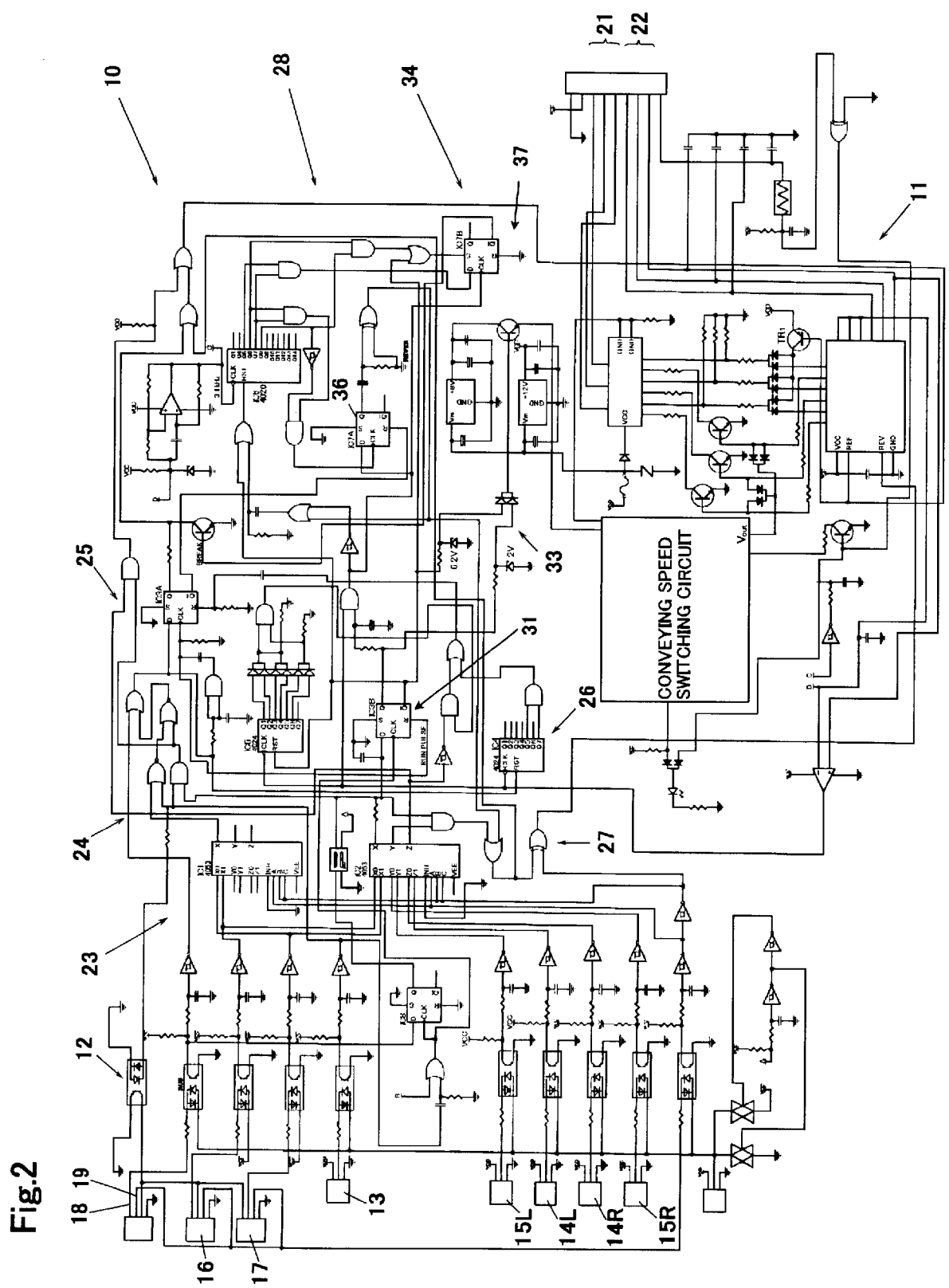
FIG. 2 illustrates an example of a circuit diagram of the zone controller.

Although the configuration of the zone controller 6b in the control zone B where the stop control is carried out is illustrated in detail in FIGS. 1 and 2. The zone controller 6b mainly comprise a control circuit 10 mainly composed of a logic circuit, a drive circuit 11 for outputting a control current to the motor contained in the motor roller 4a on the basis of control signals from the control circuit 10, and an input-output signal interface 12 of various sensor signals, the command signal from the host controller, and so forth. The control signals include a conveyance signal whose state transition occurs between an H level (ON) and an L level (OFF), a conveying speed signal whose state transition occurs between approximately 5 V (a normal conveying speed) and approximately 0.8 V (a low speed operating speed), and a forward/reverse signal (CW/CCW) whose state transition occurs between an H level (reverse rotation) and an L level (forward rotation).

The drive circuit 11 turns a transistor $TR_1$ off when the conveyance signal is off to simultaneously short-circuit all drive coils in the motor, thereby braking the motor by a short-circuit brake. In the present embodiment, "output a control current to a motor" shall include a manner of a current in performing braking by the short-circuit brake. When the conveyance signal is on, a motor M is driven at a rotational speed corresponding to the conveying speed signal, and a control current for driving the motor M in a direction indicated by the forward/reverse signal is outputted to the motor M. The motor is a three-phase blushless DC motor, and a detection signal of its Hall element (magnetic pole position detector) is inputted to the drive circuit in order to carry out feedback control. There exist three input signal lines, and a rotational pulse signal is pulled out of one of the input signal lines. The rotational pulse signal is one in which two pulses are generated every time the motor rotates once. The rotational pulse signal is inputted to the control circuit 10. The drive circuit 11 comprises a conveying speed switching circuit, as shown in FIG. 2, and switches the rotational speed of the motor by also switching an output voltage $V_{out}$ to approximately 0 V when the conveying speed signal indicates a low speed state (when it is at approximately 0 V) and switching the output voltage $V_{out}$ to approximately 12 V when the conveying speed signal is approximately 5 V. The details of the circuit configuration of the drive circuit 11 is approximately the same as that in the conventionally known circuit configuration and hence, FIG. 2 is referred to, to omit the detailed description.

Furthermore, the zone controller 6b comprises as input-output terminals a first detection signal input terminal 13 for inputting the detection signal of the first sensor SB, second detection signal input terminals 14L and 14R for inputting the detection signals of the second sensors $S_{LS}$ and $S_{RS}$, third detection signal input terminals 15L and 15R for inputting the detection signals of the third sensors $S_{LL}$ and $S_{RL}$, adjacent zone sensor input terminals 16 and 17 for inputting the detection signals of the first sensors SA and SC in the zone controllers 6a and 6c in the adjacent control zones A and C, a line operation signal input terminal 18 for inputting the RUN/STOP signal from the P.L.C, a line conveyance direction signal input terminal 19 for inputting the CW/CCW signal from the P.L.C., a first detection signal output terminal 20 for outputting the detection signal of the first sensor SB to the P.L.C. and the other zone controllers, a motor control current output terminal 21 for outputting the control current to the motor M, and a magnetic pole position signal input terminal 22 for inputting the detection signal (output) of the Hall element (magnetic pole position detector) from the motor M. Each of the input-output terminals can be properly provided in a connector or the like in consideration of the convenience of wiring. In the present embodiment, an L level signal is inputted to the second detection signal input terminal 14L or 14R when the corresponding second sensor $S_{LS}$ or $S_{RS}$ detects the presence of the article, while an H level signal is inputted when it does not detect the presence of the article.

The control circuit 10 mainly comprises a sensor switching circuit 23 in the direction of conveyance, a conveyance start signal generating logic circuit 24, a conveyance signal holding circuit (conveyance signal switching circuit) 25, a pulse counter 26, a forward/reverse signal generating logic circuit (forward/reverse signal switching circuit) 27, and a stop control circuit 30 (stop control means).

The sensor switching circuit 23 is mainly composed of a switching IC (IC1, IC2) for choosing which of right and left sensor signals is used as a signal on the upstream side or a signal on the downstream side on the basis of the CW/CCW signal. When the CW/CCW signal indicates forward rotation, the detection signal of the first sensor SA in the zone A is outputted as a load presence signal $S_{UP}$ in the upstream zone, the detection signal of the first sensor SC in the zone C is outputted as a load presence signal $S_{DOWN}$ in the downstream zone, and the detection signal of the second sensor $S_{RS}$ on the right side and the detection signal of the third sensor $S_{RL}$ on the right side are respectively outputted as a stop position upstream end signal $S_S$ and a stop position downstream end signal $S_L$ in FIG. 5. On the other hand, when the CW/CCW signal indicates reverse rotation, the detection signal of the first sensor SA in the zone A is outputted as a load presence signal $S_{DOWN}$ in the downstream zone, the detection signal of the first sensor SC in the zone C is outputted as a load presence signal $S_{UP}$ in the upstream zone, and the detection signal of the second sensor $S_{LS}$ on the left side and the detection signal of the third sensor $S_{LL}$ on the left side are respectively outputted as a stop position upstream end signal $S_S$ and a stop position downstream end signal $S_L$ in FIG. 5. The CW/CCW signal from the P.L.C. is supplied to the drive circuit 11 through the forward/reverse signal generating logic circuit 27.

Figure 7:
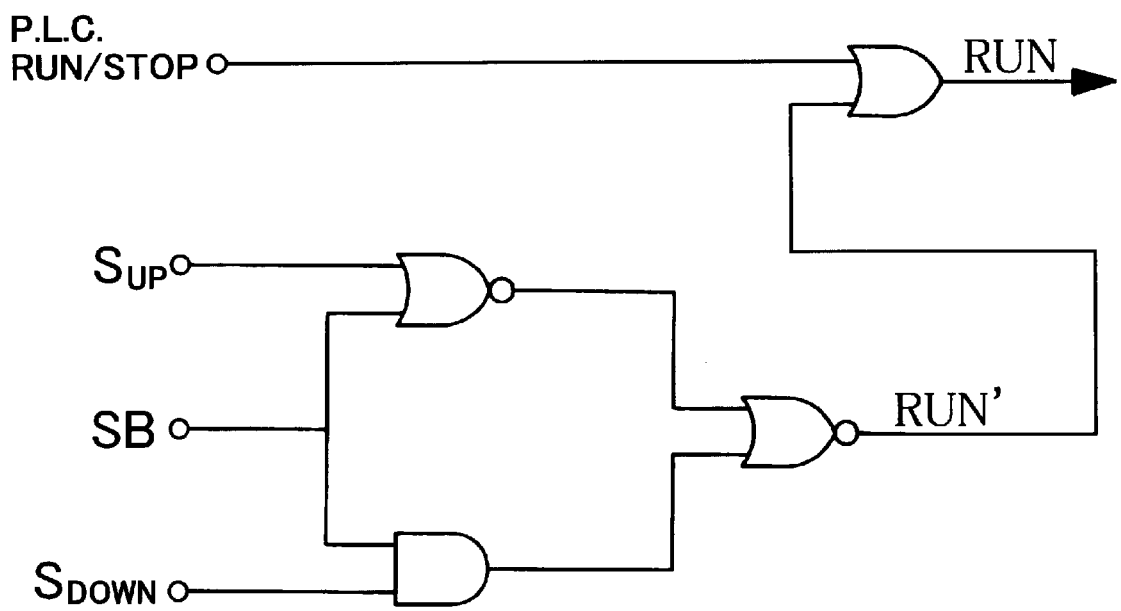
FIG. 7 illustrates a logic circuit of a conveyance start signal generator in the zone controller and a table showing its logical values.

The logic circuit 24 for generating a conveyance start signal is illustrated in detail in FIG. 7. The logic circuit 24 generates a RUN' signal by a sensor logic on the basis of the detection signal of the load presence sensor SB in the control zone B, the load presence signal $S_{UP}$ in the upstream zone, and the load presence signal $S_{DOWN}$ in the downstream zone. Further, the logical OR between the RUN' signal and the RUN/STOP signal from the P.L.C. (normally, a pulse signal) is carried out, and is outputted as a RUN signal (a conveyance start signal) to the conveyance signal holding circuit 25. The holding circuit 25 is mainly composed of a D flip-flop (IC3A), and a Q output is set at an H level by the rise in pulses composing the RUN signal and is held until a reset signal is inputted. The Q output is supplied to the drive circuit 11 as a conveyance signal.

The RUN signal generated by the logic circuit 24 passes through the integration circuit and the differentiation circuit, to generate a RUN pulse signal which is slightly delayed from the time when pulses composing the RUN signal rise. The pulse counter 26 is reset by the pulse signal. A rotational pulse signal is inputted to a CLK input of the pulse counter 26, to count the number of pulses composing the rotational pulse signal from the time when the RUN signal is generated. In the present embodiment, when 80 pulses are counted from the time when the RUN signal is switched by the passage of the article through the first sensor SB, the holding circuit 25 is reset to turn the conveyance signal off, thereby stopping the motor by the short-circuit brake. The number of pulses is set to a number necessary and sufficient to convey the article to the downstream control zone C. In this case, the article has already been delivered to the downstream control zone C, so that accurate stop position control is not required. Accordingly, the stop control in the present invention is not carried out. An object of the present embodiment is to perform efficient zero pressure accumulation. The stop control is required when an attempt to stop the article in a position at a downstream end of the zone B is made because another article exists in the downstream control zone C.

The stop control circuit 30 comprises stop control on/off means 31, pulse counting means (pulse counter) 32 for making the distance from the position at the time when the stop control is started to the stop position constant, conveying speed signal switching means (circuit) 33 for switching the motor conveyance driving speed at the time of the stop control to a low speed, motor rotational speed judgment means 34 for switching a braking force depending on the rotational speed of the motor at the time of the stop control, and a stop position adjustment circuit 35 for finely adjusting the actual stop position of the article.

The details of the stop control circuit 30 will be described with reference to FIG. 2. The stop control on/off circuit 31 is mainly composed of a D flip-flop (FF) (IC3B). The detection signal of the first sensor SC in the downstream control zone C is inputted to a D input of the FF. Further, the detection signal of the first sensor SB in the zone B is inputted to a CLK input of the FE If an article is conveyed to a position at the center of the control zone B while another article exists in the downstream control zone C, a Q output is set to an H level (on the other hand, a $\overline{Q}$ output is set to an L level), and the stop control is started from the time when the Q output rises.

When the stop control is started, a rotational pulse signal is accepted in the motor rotational speed judgment circuit 34. The judgment circuit 34 comprises a counter (IC6) for measuring the period between pulses composing the rotational pulse signal, and a high-frequency oscillation circuit for supplying a high frequency pulse having a frequency of 3.1 kHz to a CLK input of the counter. A reset pulse is inputted to an $R_{ST}$ input of the counter (IC6) when the rotational pulse signal falls. By such construction, the period between pulses appears in an output of the counter (IC6), thereby making it possible to indirectly judge the rotational speed of the motor on the basis of the period between pulses. That is, it is indicated that the rotational speed of the motor is low when the pulse width of the rotational pulse signal is large, and it is indicated that the rotational speed is high when the pulse width is small.

The judgment circuit 34 comprises a plugging signal generator 36 (IC7A) and a short-circuit brake signal generator 37 (IC7B). Each of the generators 36 and 37 is mainly composed of a D flip-flop (D-FF) and a logic circuit for judging whether or not a predetermined number of pulses is counted from a predetermined output signal of the counter (IC6).

An H-level signal is inputted to a D input of the D-FF in the short-circuit brake signal generator 37 from the time when the counter (IC6) counts 80 pulses to the time when it counts 95 pulses (from the time when approximately 25.8 msec has elapsed since the rotational pulse signal fell to the time when approximately 31 msec has elapsed since the rotational pulse signal fell). The rotational pulse signal is inputted to a CLK input of the D-FF in the signal generator 37. When the counter (IC6) counts 160 pulses (when approximately 51.6 msec has elapsed from the time when the rotational pulse signal fell), a signal which rises from an L level to an H level is inputted to an S input of the signal generator 37. A $\overline{Q}$ output of the D-FF in the signal generator 37 turns the conveyance signal off when it is at an H level. In the present embodiment, the $\overline{Q}$ output turns a transistor connected to a Q output signal line of the conveyance signal holding circuit 25 on or off. The $\overline{Q}$ output grounds the Q output signal line by turning the transistor on when it is at an H level, to turn the conveyance signal off, so that the motor is subjected to short-circuit braking by the drive circuit 11.

A reversed signal of the rotational pulse signal is inputted to a D input of the D-FF in the plugging signal generator 36. Further, a signal which rises to an H level when the counter (IC6) counts 96 pulses (when approximately 31 msec has elapsed since the rotational pulse signal rose) and falls to an L level when it counts 128 pulses (when approximately 41 msec has elapsed since the rotational pulse signal fell) is inputted to a CLK input of the D-FF in the signal generator 36. When a Q output of the signal generator 36 rises to an H level, a temporary plugging pulse signal is generated by the differentiation circuit, the plugging pulse signal forcedly raises the reversed signal and the conveyance signal which are supplied to the drive circuit 11 to an H level, so that the motor is subjected to plugging temporarily.

Figure 3:
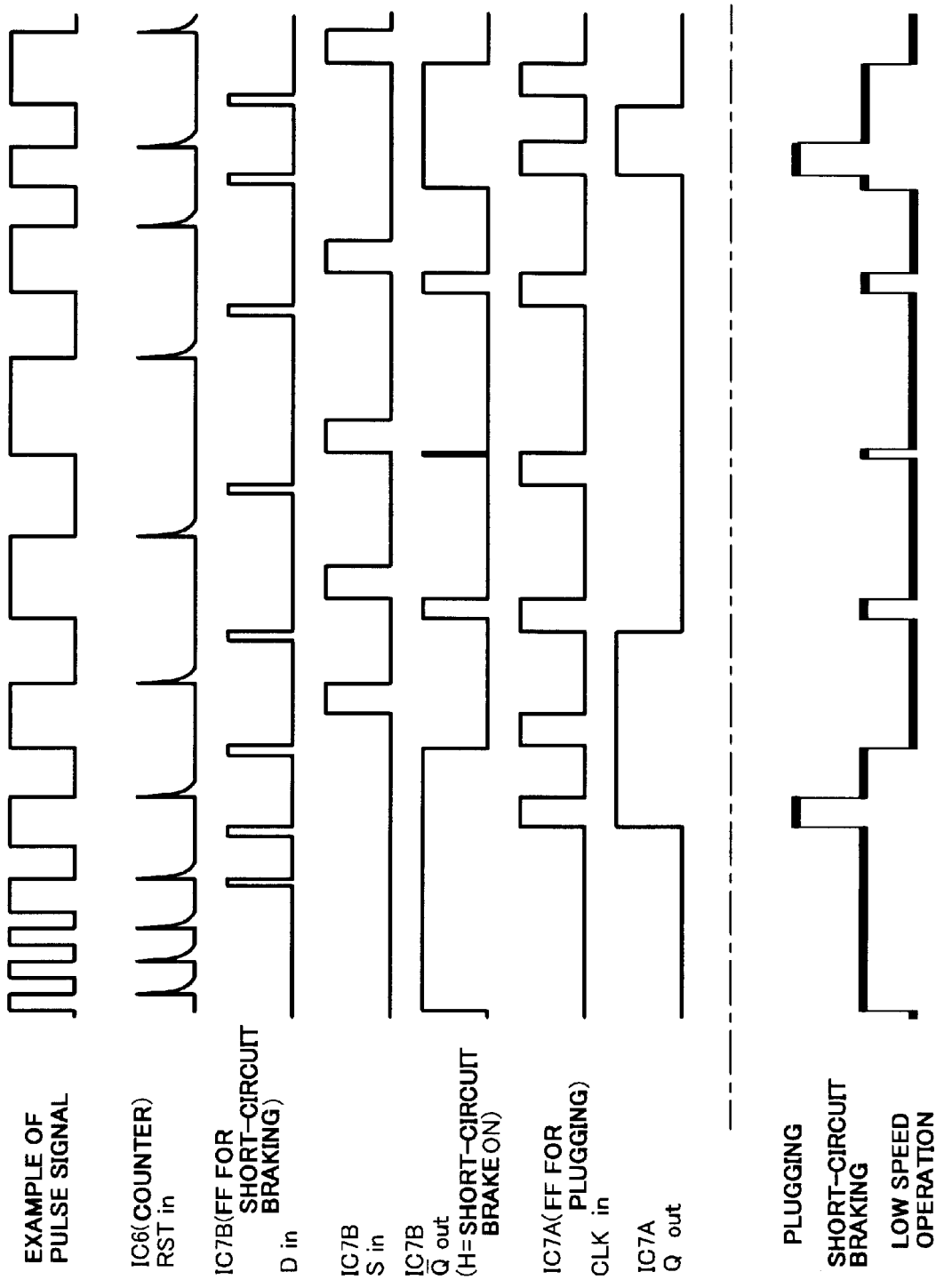
FIG. 3 is a timing chart of main signals in a stop control circuit during stop control by the zone controller and a braking state obtained by the signals.

A timing chart of main signals at the time of such stop control is illustrated in FIG. 3. When the stop control is started, the counter (IC6) for measuring the pulse width is reset in a short time because the number of rotations of the motor is relatively large. Accordingly, the signal supplied to each of the signal generators 36 and 37 from the counter is maintained at an L level. Consequently, the $\overline{Q}$ output of the short-circuit brake signal generator 37 enters an H level, so that the motor is braked by the short-circuit brake. It is preferable that the plugging is not thus performed until the motor is deceleratedto some extent from the time when the stop control is started.

When the pulse period is larger than 31 msec, and a time period between the time when the rotational pulse signal falls and the time when it rises again is smaller than 31 msec, a CLK input of the FF for plugging (IC7A) enters an H level, so that a Q output of the FF rises. Accordingly, a plugging pulse signal is generated, so that plugging is temporarily performed.

When the motor is further decelerated, and the time period between the time when the rotational pulse signal falls and the time when it rises again is in a range of 25.8 to 31 msec, a $\overline{Q}$ output of the FF for short-circuit braking (IC7B) is turned off, and the conveyance signal outputted to the drive circuit is turned on. Accordingly, the motor is operated at low speed.

When the motor is decelerated to a low speed state, and the time period between the time when the rotational pulse signal falls and the time when it rises again exceeds 31 msec, the $\overline{Q}$ output of the FF for short-circuit braking (IC7B) is temporarily turned on when the rotational pulse signal rises. When approximately 51.6 msec has elapsed from the time when the rotational pulse signal falls, the $\overline{Q}$ output is forced to be lowered to an L level, to operate the motor at low speed.

When the grip between the article and the drive roller 4a, which have slipped relative to each other by the start of braking, is recovered, and the rotational speed of the motor is increased again by a rotating force to the drive roller 4a arising from the inertia of the article, short-circuit braking and plugging are suitably performed, as shown in FIG. 3, and much time is assigned to the step of performing such braking, to perform efficient braking while making it easy to recover the grip, thereby making it possible to carry out stop position control with high precision.

When the rotational pulse signal counts 18 pulses from the time when the stop control is started, the output signal to the stop position adjustment circuit 35 from the pulse counting means 32 rises to an H level. At this time, when the detection signal of the second sensor $S_S$ is on (if the article passes through the second position), a stop pulse is inputted to a RESET input of the conveyance signal holding circuit 25, to turn the conveyance signal off. That is, the stop control is continued until the article passes through the second position, not to perform final braking by the short-circuit brake, thereby conveying the article at low speed to a predetermined stop position.

When the detection signal of the third sensor $S_L$ is inputted to the stop position adjustment circuit 35, and the detection signal is at an H level (the article is conveyed beyond the third position), the forward/reverse signal is forced to enter a reversed state (an H level), and the conveyance signal is turned on, to reverse the drive roller until the article is positioned short of the third position. The drive roller is reversed only when the load presence signal $S_{DOWN}$ in the downstream zone is at an H level, that is, an article exists in the downstream zone C.

According to the zone controller in the present embodiment, the motor M can be subjected to stop control, considering as stop control start conditions the condition that the load presence signal $S_{DOWN}$ in the downstream control zone is at an H level, and the condition that the detection signal of the first load presence sensor SB in the zone B rises to an H level during the conveying operation of the conveying drive roller 4a. The stop control makes it possible to reduce the amount of slip, perform reliable braking at a short distance, and improve the precision of the stop position control by switching the motor to three states, that is, short-circuit braking, plugging, and low speed operation depending on the rotational speed of the motor on demand to dynamically adjust a braking force of the motor.

The article is conveyed from the time when the stop control is started until the rotational pulse signal counts a predetermined number of pulses, thereby making it possible to stop the article with high precision in a predetermined stop position on the downstream side of the zone B. Further, the stop position can be finely adjusted, thereby making it possible to significantly increase the precision of the final stop position and therefore, to realize zero pressure accumulation in which spacing between conveyed articles is close.

According to the present invention, it is possible to carry out stop position control with significantly high precision in a roller conveyor for carrying out zone control, and it is easy to recover a conveyed article from a slipped state to a gripped state at the time of braking a drive roller. Accordingly, the amount of slip is reduced, thereby making it possible to improve the precision of stop control based on the number of rotations of the drive roller or a motor for driving the drive roller.

If a load presence sensor for starting the stop control is provided in a position at the center in the direction of conveyance of a control zone, it is possible to easily cope with a case where the direction of conveyance is reversed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A zone control method in a roller conveyor which is divided into a plurality of control zones arranged in the direction of conveyance and has conveying drive rollers driven by a motor provided in the respective control zones, comprising the step of
controlling the stop of said motor when predetermined stop control start conditions are satisfied during the conveying operation of the conveying drive roller provided in the predetermined control zone,
the stop control switching a braking force of the motor, depending on the rotational speed of the motor, by changing the state of the motor between a) short-circuit braking and b) plugging states.

2. A zone control method in a roller convyor which is divided into a plurality of control zones arranged in the direction of conveyance and has conveying drive rollers driven by a motor provided in the respective control zones, comprising the step of
controlling the stop of said motor when predetermined stop control start conditions are satisfied during the conveying operation of the conveying drive roller provided in the predetermined control zone,
the stop control switching a braking force of the motor depending on the rotational speed of the motor,
wherein the stop control comprises the steps of
subjecting the motor to relatively weak braking, and
subjecting the motor to relatively strong braking when the rotational speed of the motor is increased by a rotating force arising from the inertia of an article which is conveyed on the conveyor after the rotational speed of the motor is reduced once.

3. A zone control method in a roller conveyor which is divided into a plurality of control zones arranged in the direction of conveyance and has conveying drive rollers driven by a motor provided in the respective control zones, comprising the step of
controlling the stop of said motor when predetermined stop control start conditions are satisfied during the conveying operation of the conveying drive roller provided in the predetermined control zone,
the stop control switching a braking force of the motor depending on the rotational speed of the motor,
wherein the stop control comprises the steps of
braking the motor, and
operating the motor at low speed,
much time being assigned to the step of braking the motor when the rotational speed of the motor is relatively high, while being assigned to the step of operating the motor at low speed when the rotational speed of the motor is relatively low.

4. A zone control method in a roller conveyor which is divided into a plurality of control zones arranged in the direction of conveyance and has conveying drive rollers driven by a motor provided in the respective control zones, comprising the step of
controlling the stop of said motor when predetermined stop control start conditions are satisfied during the conveying operation of the convering drive roller provided in the predetermined control zone, the stop control switching a braking force of the motor depending on the rotational speed of the motor, wherein the stop control comprises the steps of subjecting the motor to relatively weak braking, subjecting the motor to relatively strong braking when the rotational speed of the motor is increased by a rotating force arising from inertia of an article which is conveyed on the conveyor after the rotational speed of the motor is reduced once, and operating the motor at low speed, much time being assigned to the step of braking the motor when the rotational speed of the motor is relatively high, while being assigned to the step of operating the motor at low speed when the rotational speed of the motor is relatively low.

5. The method according to claim 2, wherein the weak braking is performed by subjecting the motor to short-circuit braking, and the strong braking is performed by subjecting the motor to plugging.

6. The method according to claim 1, wherein the motor is a blushless DC motor, a pulse signal is generated from an output signal of a magnetic pole detector of the motor, and the rotational speed of the motor is judged on the basis of the pulse signal.

7. The method according to claim 6, wherein the operating state of the motor is updated for each of pulses composing the pulse signal during the stop control.

8. A zone control method in a roller conveyor which is divided into a plurality of control zones arranged in the direction of conveyance and has conveying drive rollers driven by a motor provided in the respective control zones, comprising the step of controlling the stop of said motor when predetermined stop control start conditions are staisfied during the conveying operation of the conveying drive roller provided in the predetermined control zone, the stop control switching a braking force of the motor depending on the rotational speed of the motor, wherein the motor is a brushless DC motor, a pulse signal is generated from an output signal of a magnetic pole detector of the motor, and the rotational speed of the motor is judged on the basis of the pulse signal, wherein the stop control is carried out until the pulse signal counts a predetermined number of pulses from the time when the stop control is started, and completely stops the motor by a short-circuit brake after the stop control is terminated.

9. The method according to claim 8, wherein the motor is operated at low speed until the article is conveyed to a predetermined position in the direction of conveyance in a predetermined control zone where the stop control is carried out after the stop control is terminated, and is then completely stopped by the short-circuit brake.

10. The method according to claim 8, wherein the predetermined number of pulses is larger than the number of pulses composing the pulse signal from the time when the short-circuit brake is started to the time when an article having a predetermined weight which is conveyed on the conveyor is completely stopped by the short-circuit brake.

11. A zone control method in a roller conveyor which is divided into a plurality of control zones arranged in the direction of conveyance and has conveying drive rollers driven by a motor provided in the respective control zones, comprising the step of controlling the stop of said motor when predetermined stop control start conditions are satisfied during the conveying operation of the conveying drive roller provided in the predetermined control zone, the stop control switching a braking force of the motor depending on the rotational speed of the motor, said method further comprising the step of reversing the conveying drive roller, considering as a requirement the condition that the article is positioned beyond the predetermined position in the direction of conveyance in the predetermined control zone where the stop control is carried out.

12. A zone control method in a roller conveyor which is divided into a plurality of control zones arranged in the direction of conveyance and has conveying drive rollers driven by a motor provided in the respective control zones, comprising the step of controlling the stop of said motor when predetermined stop control start conditions are satisfied during the conveying operation of the conveying drive roller provided in the predetermined control zone, the stop control switching a braking force of the motor depending on the rotational speed of the motor, wherein at least the fact that a state transition of a load presence signal indicating whether or not the article exists at the center in the direction of conveyance in the predetermined control zone where the stop control is carried out occurred is included as predetermined stop control start conditions.

13. A zone controller for a predetermined control zone of a roller conveyor line which is divided into a plurality of control zones arranged in the direction of conveyance, for carrying out driving and braking control of a DC motor for rotating a conveying drive roller provided in the predetermined control zone comprising a control circuit;

a drive circuit for outputting a control current to said motor on the basis of a control signal from the control circuit;

a first detection signal input terminal for inputting a detection signal of a first sensor for detecting whether or not an article is conveyed to a first position in the direction of conveyance in said predetermined control zone; and a magnetic pole position signal input terminal for inputting an output signal of a magnetic pole detector of said motor, said control circuit comprising stop control means started, considering as a requirement the condition that a state transition of the detection signal of the first sensor occurs, the stop control means generating said control signal such that a braking force of the motor is switched on the basis of a pulse signal generated from the output signal of the magnetic pole detector, the stop control means generating signals to the drive circuit for causing the motor to be selectively placed in a short-circuit braking state and b) a plugging state depending on the rotational speed of the motor.

14. A zone controller for a predetermined control zone of a roller conveyor line which is divided into plurality of control zones arranged in the direction of conveyance, for carrying out driving and braking control of a DC motor for rotating a conveying drive roller provided in the predetermined control zone comprising a control circuit;

a drive circuit for outputting a control current to said motor on the basis of a control signal from the control circuit;

a first detection signal input terminal for inputting a detection signal of a first sensor for detecting whether or not an article is conveyed to a first position in the direction of conveyance in said predetermined control zone; and a magnetic pole position signal input terminal for inputting and output signal of a magnetic pole detector of said motor, said control circuit comprising stop control means started, considering as a requirement the condition that a state transition of the detection signal of the first sensor occurs, the stop control means generating said control signal such that a braking force of the motor is switched on the basis of a pulse signal generated from the output signal of the magnetic pole detector, wherein a conveyance signal and a forward/reverse signal are included as control signals supplied from the control circuit to the drive circuit, the drive circuit outputs to the motor the control current for braking the motor by a short-circuit brake when the conveyance signal is off, while outputting to the motor the control current for driving the motor in a direction indicated by the forward/reverse signal when the conveyance signal is on, and the stop control means comprises short-circuit brake signal generation means for turning the conveyance signal off, plugging signal generation means for turning the conveyance signal on the bringing the forward/reverse signal into a reversed state, the generation of the control signal by the plugging signal generation means preceding the generation of the control signal by the short-circuit brake signal generation means.

15. A zone controller for a predetermined control zone of a roller conveyor line which is divided into a plurality of control zones arranged in the direction of conveyance, for carrying out driving and braking control of a DC motor for rotating a conveying drive roller provided in the predetermined control zone comprising a control circuit;

a drive circuit for outputting a control current to said motor on the basis of a control signal from the control circuit;

a first detection signal input terminal for inputting a detection signal of a first sensor for detecting whether or not an article is conveyed to a first position in the direction of conveyance in said predetermined control zone; and a magnetic pole position signal input terminal for inputting an output signal of a magnetic pole detector of said motor, said control circuit comprising stop control means started, considering as a requirement the condition that a state transition of the detection signal of the first sensor occurs, the stop control means generating said control signal such that a braking force of the motor is switched on the basis of a pulse signal generated from the output signal of the magnetic pole detector, wherein a conveyance signal and a conveying speed signal are included as control signals supplied from the control circuit to the drive circuit, drive circuit outputs to the motor the control current for braking the motor by a short-circuit brake when the conveyance signal is off, while outputting to the motor the control current for driving the motor at a rotational speed corresponding to the conveying speed signal when the conveyance signal is on, and the stop control means comprises low speed switching means for switching said conveying speed signal to a low speed state when it is started, and short-circuit brake signal generation means for turning the conveyance signal on or off on the basis of the pulse waveform of the pulse signal.

16. A zone controller for a predetermined control zone of a roller conveyor line which is divided into a plurality of control zones arranged in the direction of conveyance, for carrying out driving and braking control of a DC motor for rotating a conveying drive roller provided in the predetermined control zone comprising a control circuit;

a drive circuit for outputting a control current to said motor on the basis of a control signal from the control circuit;

a first detection signal input terminal for inputting a detection signal of a first sensor for detecting whether or not an article is conveyed to a first position in the direction of conveyance in said predetermined control zone; and a magnetic pole position signal input terminal for inputting an output signal of a magnetic pole detector of said motor, said control circuit comprising stop control means started, considering as a requirement the condition that a state transition of the detection signal of the first sensor occurs, the stop control means generating said control signal such that a braking force of the motor is switched on the basis of a pulse signal generated from the output signal of the magnetic pole detector, wherein a conveyance signal, a conveying speed signal, and a forward/reverse signal are included as control signals supplied from the control circuit to the drive circuit, the drive circuit outputs to the motor the control current for braking the motor by a short-circuit brake when the conveyance signal is off, while driving the motor at a rotational speed corresponding to the conveying speed signal and outputting to the motor the control current for driving the motor in a direction indicated by the forward/reverse signal when the conveyance signal is on, and the stop control means comprises low speed switching means for switching said conveying speed signal to a low speed state when it is started, short-circuit brake signal generation means for turning the conveyance signal on or off on the basis of the pulse waveform of the pulse signal, and plugging signal generation means for turning the conveyance signal on and bringing the forward/reverse signal into a reversed state, the generation of the control signal by the plugging signal generation means preceding the generation of the control signal by the short-circuit brake signal generation means.

17. The zone controller according to claim 13, wherein the motor is a blushless DC motor, and a signal representing the rotational speed of the motor is a pulse signal generated from an output of a Hall element of said motor.

18. The zone controller according to claim 17, wherein the stop control means updates a control signal to be outputted to the drive circuit for each of pulses composing the pulse signal.

19. A zone controller for a predetermined control zone of a roller conveyor line which is divided into a plurality of control zones arranged in the direction of conveyance, for carrying out driving and braking control of a DC motor for rotating a conveying drive roller provided in the predetermined control zone comprising a control circuit;

a drive circuit for outputting a control current to said motor on the basis of a control signal from the control circuit;

a first detection signal input terminal for inputting a detection signal of a first sensor for detecting whether or not an article is conveyed to a first position in the direction of conveyance in said predetermined control zone; and a magnetic pole position signal input terminal for inputting an output signal of a magnetic pole detector of said motor, said control circuit comprising stop control means started, considering as a requirement the condition that state transition of the detection signal of the first sensor occurs, the stop control means generating said control signal such that a braking force of the motor is switched on the basis of a pulse signal generated from the output signal of the magnetic pole detector, wherein the motor is a brushless DC motor, and a signal representing the rotational speed of the motor is a pulse signal generated from an output of a Hall element of said motor, wherein the stop control means generates a control signal for braking the motor by the short-circuit brake when the pulse signal counts a predetermined number of pulses from the time when it is started.

20. The zone controller according to claim 19, comprising a second detection signal input terminal for inputting a detection signal of a second sensor for detecting whether or not the article is conveyed to a second position in the direction of conveyance in the predetermined control zone, the second position being on the downstream side of the first position in the direction of conveyance, the motor not being braked by the short-circuit brake until the detection signal which shows that the article is conveyed to the second position is outputted by the second sensor after the predetermined number of pulses is counted.

21. The zone controller according to claim 19, wherein the predetermined number of pulses is set to a number larger than the number of pulses composing the pulse signal from the time when the short-circuit brake is started to the time when an article having a predetermined weight which is conveyed on the conveyor is completely stopped by the short-circuit brake.

22. A zone controller for a predetermined control zone of a roller conveyor line which is divided into a plurality of control zones arranged in the direction of conveyance, for carrying out driving and braking control of a DC motor for rotating a conveying drive roller provided in the predetermined control zone comprising control circuit;

a drive circuit for outputting a control current to said motor on the basis of a control signal from the control circuit;

a first detection signal input terminal for inputting a detection signal of a first sensor for detecting whether or not an article is conveyed to a first position in the direction of conveyance in said predetermined control zone; and a magnetic pole position signal input terminal for inputting an output signal of a magnetic pole detector of said motor, said control circuit comprising stop control means started, considering as a requirement the condition that a state transition of the detection signal of the first sensor occurs, the stop control means generating said control signal such that a braking force of the motor is switched on the basis of a pulse signal generated from that output signal of the magnetic pole detector, said zone controller further comprising a third detection signal input terminal for inputting a detection signal of a third sensor for detecting whether or not the article is conveyed to a third position in the direction of conveyance in the predetermined control zone, the third position being on the downstream side of the first position in the direction of conveyance, the control circuit generating a control signal for reversing the motor, considering as a requirement the condition that the article is beyond the third position.

23. The zone controller according to claim 13, further comprising an upstream connecting terminal to another zone controller on the upstream side, a downstream connecting terminal to another zone controller on the downstream side, and a connecting terminal to a host controller, the upstream connecting terminal comprising at least an output terminal of the detection signal of the first sensor, and an input terminal of the detection signal of the first sensor in an upstream control zone, the downstream connecting terminal comprising at least an output terminal of the detection signal of the first sensor, and an input terminal of the detection signal of the first sensor in a downstream control zone, the control circuit comprising conveyance start signal generation means for generating a conveyance start signal from the detection signal of the first sensor and the detection signals of the first sensors in the upstream and downstream control zones, the conveyance of the conveying drive roller being started by the state transition of the conveyance start signal.

* * * * *